United States Patent Office 3,300,412
Patented Jan. 24, 1967

3,300,412
PHOSPHORESCENT OPAL GLASSES
Leo A. Rogers, Corning, N.Y., assignor to Corning Glass Works, Corning, N.Y., a corporation of New York
No Drawing. Filed Aug. 7, 1963, Ser. No. 300,662
5 Claims. (Cl. 252—301.6)

This invention relates to phosphorescent opal glasses and a novel method for producing the same.

It is known to incorporate a prepared phosphor, such as a zinc sulfide phosphor, into a glass matrix to form a phosphorescent glass. Generally, this is accomplished by physically mixing a phosphor with a finely divided enamel or glass frit and firing the mixture to form a phosphorescent glass. The preparation of phosphorescent glasses in this manner requires the separate preparation of the phosphor and the base glass, followed by mixing and fusing steps.

It is an object of the present invention to provide a method of preparing phosphorescent glasses wherein the glass and phosphor are prepared in a single step.

It is a further object to provide a method of forming phosphorescent opal glasses from non-phosphorescent batch ingredients in a single operation.

It is a still further object to provide novel phosporescent opal glasses which can be formed into various shapes by conventional glass-forming techniques.

I have now found that phosphorescent opal glasses, containing a metal sulfide phosphor dispersed therein, may be prepared from non-phosphorescent, metal sulfide-free batch materials. The present invention, therefore, resides in a phosphorescent opal glass comprising the fusion product of non-phosphorescent batch materials and containing, as a separate phase dispersed within the glass, a metal sulfide phosphor which is a reaction product of the batch materials, the reaction product being formed in situ during the melting of the glass.

In another aspect, the invention resides in a method of preparing phosphorescent opal glasses comprising firing at a melting temperature of between about 900° C. and 1400° C., a glass-making batch containing elemental sulfur, a source of halide ions and an oxide of a metal capable of forming a sulfide phosphor, for sufficient time to fuse the batch to a glassy state and react the metal oxide and sulfur in the presence of halide ions to form a metal sulfide phosphor within a glass matrix.

The glass batch materials may be mixed and melted in accordance with conventional glass-melting techniques. Although considerable variation is permissible with respect to specific formulations and batch constituents, I have found batch compositions particularly useful in the preparation of phosphorescent glasses are provided by a batch composition comprising in weight percent, on an oxide basis, 1 to 10% $SiO_2$, 1 to 10% $P_2O_5$, 5 to 20% $B_2O_3$, 1 to 10% $Al_2O_3$, 25 to 80% ZnO, 5 to 25% S and 1 to 20% halogen.

The batch compositions set forth here and in the appended claims are shown on an oxide basis. However, it should be understood that the batch constituents may, in accordance with conventional glass-melting practice, be supplied by materials other than the oxides which will, however, yield the glass-forming oxides under melting conditions. For example, boric acid may be utilized as a source of $B_2O_3$, and kaolin may be utilized as a source of $SiO_2$ and $Al_2O_3$. Similarly, the halogen may be supplied by a halogen compound such as a metal halide. The sulfur shown in the batch composition is present as elemental sulfur.

The phosphorescent properties of the glasses are contributed by a metal sulfide phosphor which forms as a reaction product of certain batch materials during melting. The metal sulfide is formed by the reaction of elemental sulfur and a divalent metal oxide included in the batch composition. I have found that a particularly efficient phosphor may be formed in a glass prepared from a composition containing 10 to 15% by weight sulfur and 60 to 75% by weight zinc oxide. During the melting of the glass, a portion of the zinc oxide reacts with the sulfur to form zinc sulfide, which precipitates and forms an opal phase within the glass.

It is generally accepted that in order for zinc sulfide to function efficiently as a phosphor, an appropriate activator must be supplied. In the phosphorescent glasses of the present invention, I have found that activation may be achieved by the presence of a halide ion. The halide ions may be supplied by including in the batch a halogen-containing material, such as zinc chloride, which will yield halide ions during melting. The halogen-containing material should be present in the batch in an amount such that the halogen component of the material is about 1 to 20% by weight of the batch.

The halogen may be present in the pre-fusion mixture as a halogen compound or, if desired, may be added during the melting operation either as elemental halogen or as a halogen compound. As the metal sulfide forms, halide ions supplied by the halogen compound are trapped and serve as activators in the metal sulfide phosphor so formed. A wide selection of halogen compounds are suitable for this purpose, the choice being governed by the requirements that the compound yield halide ions under the conditions of melting and that the cation member of the compound be compatible with or non-deleterious toward the phosphor and glass-forming constituents. Particularly useful in this respect are halogen compounds of metals which will form oxides desired in the final glass. For example, zinc chloride may be used for this purpose to yield halide ions as well as zinc ions which may remain in the final glass either as zinc sulfide or zinc oxide. The efficiency of the various halides, as activators, will vary somewhat. In general, the chlorides are the most efficient.

The activated zinc sulfide is the primary phosphor as well as the primary opal phase, in the glasses herein described; however, other phosphors as well as other opal phases may be present.

The major glass-forming constituents may be selected in accordance with the physical properties, e.g., durability workability, etc., desired in the final glass. However, the choice is further governed by the requirements that the glass composition must be one from which the metal sulfide phosphor will be precipitated during the melting and in which the various glass constituents will be compatible with the phosphor.

By way of further illustrating the invention and the manner in which it may be practiced, the following specific examples are set forth:

*Example 1*

| Batch ingredient: | Grams |
|---|---|
| $SiO_2$ | 15 |
| $P_2O_5$ | 15 |
| $B_2O_3$ | 45 |
| $Al_2O_3$ | 15 |
| $ZnO$ | 201 |
| $ZnBr_2$ | 25 |
| S | 30 |

The above ingredients were mixed as powders, placed in a covered 96% silica crucible and the crucible placed in a preheated furnace and fired at about 1100° C. for about 1 hour. The resulting glass was then poured into patty molds and cooled to room temperature. The glass appeared yellow-green and exhibited a green phosphorescence, after exposure to light from incandescent, fluorescent and ultra violet lamps.

*Example 2*

The following ingredients were mixed as powders, placed in a platinum crucible and fired in a preheated furnace at about 1400° C. for about ½ hour.

| Batch ingredient: | Grams |
|---|---|
| $SiO_2$ | 15 |
| $P_2O_5$ | 15 |
| $B_2O_3$ | 45 |
| $Al_2O_3$ | 15 |
| $SrO$ | 210 |
| S | 45 |
| $ZnCl_2$ | 15 |

The resulting glass appeared yellow-green in daylight and exhibited a green phosphorescence after exposure to daylight.

*Example 3*

The following ingredients were mixed as powders, placed in a 96% silica crucible and fired in a preheated furnace at about 1400° C. for about ½ hour.

| Batch ingredient: | Grams |
|---|---|
| $SiO_2$ | 5 |
| $P_2O_5$ | 5 |
| $B_2O_3$ | 15 |
| $SrO$ | 70 |
| $CaF_2$ | 2 |
| LiF | 1 |
| S | 10 |

The resulting glass appeared yellow-green in daylight and exhibited a green phosphorescence after exposure to daylight.

The melting conditions, e.g., firing temperature and firing time, may be varied somewhat depending on the particular batch formulation to be employed. Generally, however, the firing temperature will be between about 900° C. and 1400° C. The firing time is the period of time during which the batch is maintained at firing temperature. It is generally desirable that the firing time be sufficient to permit the formation of the glass but not long enough to permit excessive loss of the volatile constituents. For most batch formulations, a firing time of between ½ and 2 hours is sufficient. In addition, it is preferable that the firing temperature be reached rapidly to minimize losses due to volatilization of batch constituents. In the above examples, this was accomplished by placing the pre-fusion mixture in a crucible, then placing the crucible in a furnace which had been preheated to firing temperature.

Care must be taken to exclude the presence of additives or impurities which may have an adverse effect on the phosphorescent properties of the glass. For example, the presence of $CuO$, $V_2O_5$, $SnO_2$ or $MnO_2$ will decrease the phosphorescence of the glass.

However, if it is desired to vary the physical properties of the glass, glass-forming oxides which are compatible with the phosphor may be added in amounts up to about 10% by weight. For example, MgO, CaO, $TiO_2$ and BaO may be added to alter the physical properties and will have little or no effect on the phosphorescent properties.

Certain other divalent metal oxides which will react with sulfur to form a metal sulfide may be used as partial or complete substitutes for ZnO in the batch formulations. SrO may be substituted up to 100% for ZnO. However, SrO will generally form a less efficient phosphor than ZnO. Up to about 20% by weight of the ZnO or SrO may be replaced by CaO. Greater amounts will have an adverse effect on the melting of the glass. From about 1% to about 5% of the ZnO or SrO may be replaced by CdO to alter the phosphorescence from green to a yellow-orange color. Concentrations of CdO in excess of that amount exhibit a deactivating effect on the phosphor.

The elemental sulfur can be included in the initial batch mixture or can be added later to the molten batch; however, I have found it preferable to include it in the initial batch.

The glasses herein described provide a durable phosphorescent material which may be formed into useful articles by conventional glass-forming techniques. For example, the glasses may be used in the production of reflective signs, highway markers and various types of guide markers for night operations. For such uses, these glasses could provide good weathering characteristics and reflective properties as well as phosphorescent properties which enable them to be seen in the dark after having been exposed to daylight or artificial light.

I claim:
1. A method of making a phosphorescent opal glass comprising:
    firing a batch composition consisting essentially in weight percent on the oxide basis of:

| | Percent |
|---|---|
| $SiO_2$ | 1–10 |
| $Al_2O_3$ | 1–10 |
| $B_2O_3$ | 5–25 |
| $P_2O_5$ | 1–10 |
| Divalent metal oxide wherein said metal is Zn or Sr | 25–80 |
| and |  |
| Additionally S | 5–25 |
| Halogen | 1–20 | but not more than about 1% alkali metal oxide;
said firing being at a temperature of 900–1400° C. for a time of about 0.5–2.0 hours to form in situ an activated phosphor of the sulfide of said metal in crystalline form that is homogenously dispersed in and opalizes said composition.

2. A method according to claim 1 wherein said metal oxide is ZnO.

3. A method according to claim 2 wherein said ZnO is present in an amount of between 60 and 75% by weight, and said S is present in an amount of between 10 and 15% by weight.

4. A method according to claim 3 wherein said halogen is present as $ZnCl_2$.

5. A method of making a phosphorescent opal glass comprising firing at about 1100° C. for about one hour a batch composition consisting in parts by weight of about:

| | Parts by weight |
|---|---|
| $SiO_2$ | 15 |
| $P_2O_5$ | 15 |
| $B_2O_3$ | 45 |

|          | Parts by weight |
|----------|-----------------|
| $Al_2O_3$ | 15 |
| $ZnO$    | 201 |
| $ZnBr_2$ | 25 |
| $S$      | 30 | to form a green colored, phosphorescent opal glass.

References Cited by the Examiner

UNITED STATES PATENTS

| | | | |
|---|---|---|---|
| 1,153,748 | 9/1915 | Baezner | 252—301.6 |
| 2,049,765 | 8/1936 | Fischer | 252—301.4 |
| 2,219,895 | 10/1940 | Hanlein | 252—301.4 |
| 2,241,950 | 5/1941 | Huniger | 252—301.4 |
| 2,503,140 | 4/1950 | Stookey | 106—52 |
| 2,965,784 | 12/1960 | Hoffman | 252—301.6 |
| 2,986,530 | 5/1961 | Hoffman | 252—301.6 |
| 2,993,001 | 7/1961 | Shonebarger | 252—301.6 |
| 3,077,456 | 2/1963 | Billian | 252—301.6 |
| 3,236,781 | 2/1966 | Veres | 252—301.6 |

FOREIGN PATENTS 579,284    7/1924    France.

HELEN M. McCARTHY, *Acting Primary Examiner.*

TOBIAS E. LEVOW, R. D. EDMONDS,

*Assistant Examiners.*